US012746629B2

(12) United States Patent
Yang et al.

(10) Patent No.: US 12,746,629 B2
(45) Date of Patent: Sep. 29, 2026

(54) SENSING TOOL HOLDER

(71) Applicant: NATIONAL KAOHSIUNG UNIVERSITY OF SCIENCE AND TECHNOLOGY, Kaohsiung City (TW)

(72) Inventors: Hao-Ching Yang, Tainan City (TW); Hsuan Yi Lu, Kaohsiung City (TW)

(73) Assignee: NATIONAL KAOHSIUNG UNIVERSITY OF SCIENCE AND TECHNOLOGY, Kaohsiung City (TW)

( * ) Notice: Subject to any disclaimer, the term of this patent is extended or adjusted under 35 U.S.C. 154(b) by 422 days.

(21) Appl. No.: 18/453,334

(22) Filed: Aug. 22, 2023

(65) Prior Publication Data

US 2024/0238926 A1 Jul. 18, 2024

(30) Foreign Application Priority Data

Jan. 17, 2023 (TW) ................................ 112102037

(51) Int. Cl.
*B23Q 3/155* (2006.01)
*B23Q 11/10* (2006.01)

(52) U.S. Cl.
CPC ...... *B23Q 3/15546* (2013.01); *B23Q 11/1023* (2013.01)

(58) Field of Classification Search
CPC ........................ B23Q 3/15546; B23Q 11/1023
See application file for complete search history.

(56) References Cited

U.S. PATENT DOCUMENTS

| | | | | |
|---|---|---|---|---|
| 6,424,821 | B1 | 7/2002 | Komai et al. | |
| 10,828,739 | B2 * | 11/2020 | Ziegltrum .......... | B23Q 17/0952 |
| 11,084,139 | B2 | 8/2021 | Kalhori et al. | |
| 11,130,182 | B2 * | 9/2021 | Chen .................. | B23B 31/2012 |
| 11,311,959 | B2 * | 4/2022 | Hardwick .............. | B23K 20/10 |
| 11,992,910 | B2 * | 5/2024 | Bleicher .............. | B23Q 11/127 |
| 2018/0311779 | A1 | 11/2018 | Ziegltrum et al. | |
| 2019/0001456 | A1 * | 1/2019 | Kalhori .............. | B23Q 17/0952 |
| 2020/0206829 | A1 | 7/2020 | Chen | |
| 2021/0114156 | A1 | 4/2021 | Bleicher | |
| 2021/0394285 | A1 | 12/2021 | Bojanowski et al. | |

(Continued)

FOREIGN PATENT DOCUMENTS

| | | |
|---|---|---|
| CN | 104139322 A | 11/2014 |
| CN | 104139322 B | 6/2016 |

(Continued)

*Primary Examiner* — Sarang Afzali
(74) *Attorney, Agent, or Firm* — CKC & Partners Co., LLC

(57) ABSTRACT

The present disclosure provides a sensing tool holder. The sensing tool holder includes a tool holder unit, a sensing unit and a housing. The tool holder unit includes a base and an additive body mounted on the base by an additive manufacturing method. The additive body includes an assembling structure. The assembling structure is formed on an outer surface of the additive body, and includes multiple first assembling recesses and multiple second assembling recesses for increasing the freedom of installation. The sensing unit is arranged on the assembling structure. The housing is mounted around the additive body, and covers and protects the sensing unit. A closed space is formed between the housing and the additive body.

9 Claims, 7 Drawing Sheets

(56) References Cited

U.S. PATENT DOCUMENTS

| | | | |
|---|---|---|---|
| 2022/0072627 | A1 | 3/2022 | Keitzel et al. |
| 2024/0387888 | A1 | 11/2024 | Matsuoka et al. |
| 2025/0205840 | A1 | 6/2025 | Yang et al. |

FOREIGN PATENT DOCUMENTS

| | | | |
|---|---|---|---|
| CN | 110014173 | A | 7/2019 |
| CN | 215147392 | U | 12/2021 |
| CN | 114552747 | A | 5/2022 |
| CN | 115026633 | A | 9/2022 |
| CN | 114552747 | B | 10/2024 |
| DE | 102004050270 | B4 | 7/2008 |
| EP | 1439026 | A1 | 7/2004 |
| TW | 202026093 | A | 7/2020 |
| TW | 202210199 | A | 3/2022 |
| TW | M633571 | U | 11/2022 |
| TW | M634339 | U | 11/2022 |
| WO | 2023054445 | A1 | 4/2023 |

* cited by examiner

SENSING TOOL HOLDER

RELATED APPLICATIONS

This application claims priority to Taiwan Application Serial Number 112102037, filed Jan. 17, 2023, which is herein incorporated by reference.

BACKGROUND

Field of Invention

The present disclosure relates to a sensing tool holder, and more particularly, to a sensing tool holder capable of effectively dissipating heat.

Description of Related Art

For an immediacy and convenience of sensing a tool holder, sensors are embedded or attached to the tool holder by destroying the tool holder. However, setting the sensors by destroying the tool holder will affect a dynamic balance of the tool holder, so it is not ideal. In addition, under long processing time, due to the poor heat dissipation effect of the tool holder, a temperature of the tool holder is increased, which affects the stability of transmitting data of the sensors, and the industry is urgent to solve the above mentioned problems.

SUMMARY

Therefore, an objective of the present disclosure is to provide a sensing tool holder, which can increase the installation freedom of sensors and further enhance the heat dissipation efficiency.

According to the aforementioned objectives, the present disclosure provides a sensing tool holder. The sensing tool holder includes a base, an additive body, a sensing unit and a housing. The additive body is mounted on the base by an additive manufacturing method and includes an assembling structure. The assembling structure is formed on an outer surface of the additive body, and includes multiple first assembling recesses and multiple second assembling recesses. The first assembling recesses are symmetrically arranged in pairs with an axle line of the additive body as a symmetrical axle. The second assembling recesses are symmetrically arranged in pairs with the axle line of the additive body as the symmetrical axle. The sensing unit is arranged on the assembling structure. The housing is mounted around the additive body and covers the sensing unit. A closed space is formed between the housing and the additive body.

According to one embodiment of the present disclosure, the additive body is a powder bed fusion member.

According to one embodiment of the present disclosure, a passage is formed in the base. The tool holder unit includes a channel. The channel is coiled and formed in the additive body. The channel includes an inlet and an outlet. The inlet communicates with the passage. A diameter of the outlet is smaller than a diameter of the inlet.

According to one embodiment of the present disclosure, a center of the inlet and a center of the outlet are both located on the axle line of the additive body.

According to one embodiment of the present disclosure, the sensing unit includes a circuit board, a transmitting unit, a power supply and at least one sensor. The transmitting unit is disposed on the circuit board. The power supply is configured to supply a power required by the circuit board and the transmitting unit. The circuit board and the power supply are disposed in symmetrical two of the first assembling recesses. Each of the at least one sensor is disposed in a corresponding one of the second assembling recesses and is electrically connected to the circuit board. The transmitting unit is signally connected to the circuit board and each of the at least one sensor.

According to one embodiment of the present disclosure, an outer contour of each of the second assembling recesses is polygonal.

According to one embodiment of the present disclosure, the outer contour of each of the second assembling recesses is hexagonal.

According to one embodiment of the present disclosure, the channel includes a spiral section. Two ends of the spiral section are respectively connected to the inlet and the outlet. An inner diameter of the spiral section is smaller than the diameter of the inlet, and the inner diameter of the spiral section is greater that the diameter of the outlet.

According to one embodiment of the present disclosure, a minimum distance between a middle section of the spiral section and the outer surface of the additive body is smaller than a minimum distance between a head section of the spiral section and the outer surface of the additive body, and is also smaller than a minimum distance between a tail section of the spiral section and the outer surface of the additive body.

According to one embodiment of the present disclosure, the head section is connected to the inlet. The tail section is connected to the outlet. Two ends of the middle section are respectively connected to the head section and the tail section.

According to one embodiment of the present disclosure, the minimum distance between the middle section of the spiral section and the outer surface of the additive body is equal to the minimum distance between the head section of the spiral section and the outer surface of the additive body, and is also equal to the minimum distance between the tail section of the spiral section and the outer surface of the additive body.

According to one embodiment of the present disclosure, the minimum distance between the middle section of the spiral section and the outer surface of the additive body is equal to the minimum distance between the head section of the spiral section and the outer surface of the additive body, and is smaller than the minimum distance between the tail section of the spiral section and the outer surface of the additive body.

According to one embodiment of the present disclosure, the minimum distance between the middle section of the spiral section and the outer surface of the additive body is smaller than the minimum distance between the head section of the spiral section and the outer surface of the additive body, and is equal to the minimum distance between the tail section of the spiral section and the outer surface of the additive body.

According to one embodiment of the present disclosure, the housing includes a through hole. The through hole faces the transmitting unit.

According to one embodiment of the present disclosure, the additive body includes plural attached portions and plural air portions. The attached portions are located between the adjacent second assembling recesses. The air portions are located between the attached portions and the channel.

According to the aforementioned objectives, the present disclosure provides a sensing tool holder. The sensing tool holder includes a base, an additive body, a sensing unit, a housing, a first sealing ring and a second sealing ring. The additive body is mounted on the base by an additive manufacturing method and includes an assembling structure. The assembling structure is formed on an outer surface of the additive body and includes multiple first assembling recesses and multiple second assembling recesses. The first assembling recesses are symmetrically arranged in pairs with an axle line of the additive body as a symmetrical axle. The second assembling recesses are symmetrically arranged in pairs with the axle line of the additive body as the symmetrical axle. The sensing unit is arranged on the assembling structure. The housing is mounted around the additive body and covers the sensing unit. The first sealing ring is disposed between a top portion of the housing and the additive body. The second sealing ring is disposed between a bottom portion of the housing and the additive body.

The assembling structure of the present disclosure is formed on the outer surface of the additive body and can be used to accommodate the sensing unit, so that the installation freedom of the sensor is increased. The assembling structure provides the second assembling recesses to increase the installation freedom of the sensor. Thus, the sensor can sense effectively and provide real-time sensing data.

In addition, the channel of the additive body can increase a flow path of the fluid to enhance the heat dissipation efficiency and maintain a stable working temperature. Furthermore, the diameter of the outlet of the channel is smaller than the diameter of the inlet, which can provide a pressurizing effect, increase the jet flow rate, and enhance the accuracy and the chip removal efficiency, so as to achieve the purpose of enhancing the processing quality and service life.

Moreover, the housing can protect the sensing unit, such that the service life of the sensing unit can be increased.

BRIEF DESCRIPTION OF THE DRAWINGS

In order to make the above and other objectives, features, advantages, and embodiments of the present disclosure more obvious, the accompanying drawings are described as follows.

DETAILED DESCRIPTION

Figure 1A:
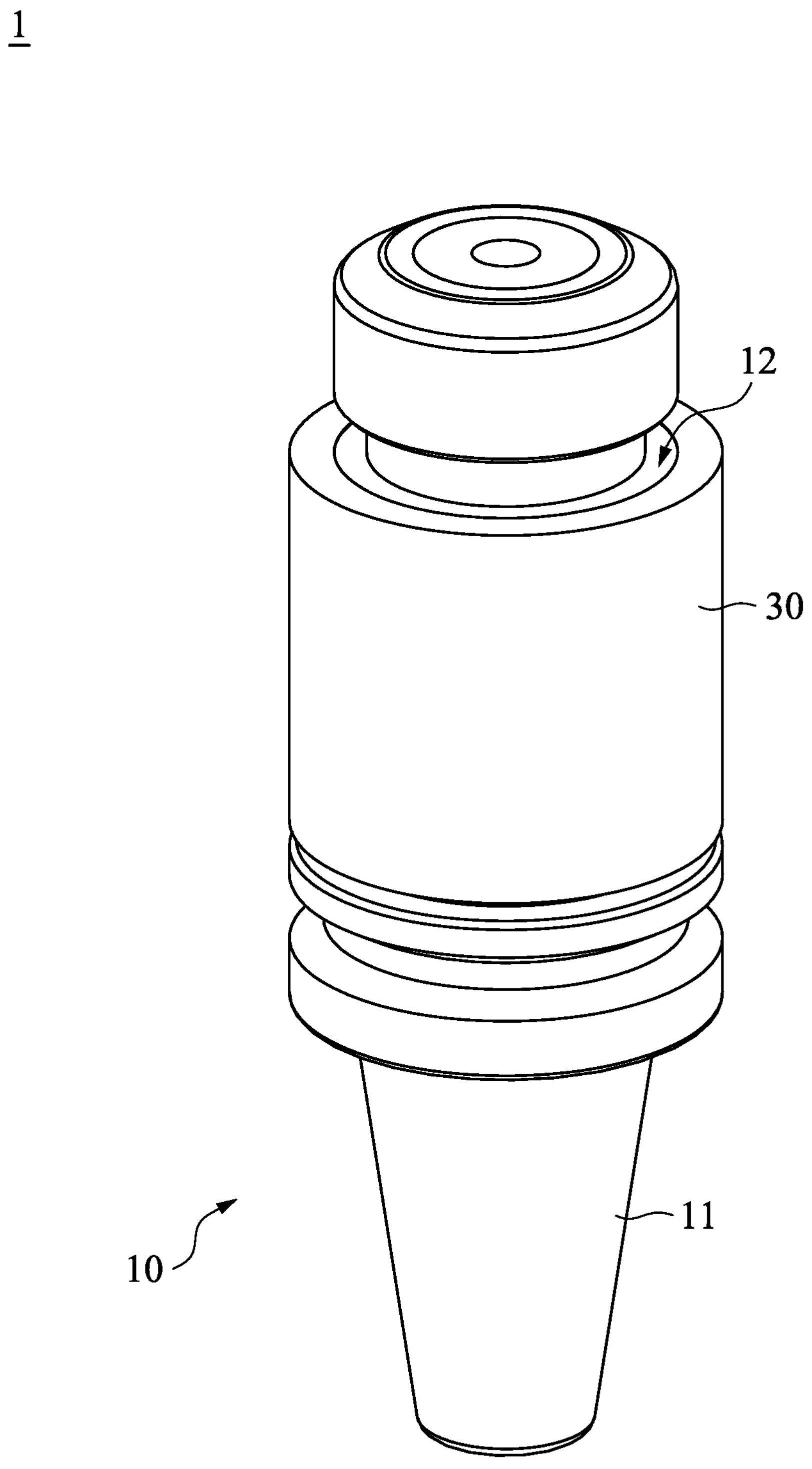
FIG. 1A is a schematic three-dimensional diagram of a sensing tool holder in accordance with one embodiment of the present disclosure.
Figure 1B:
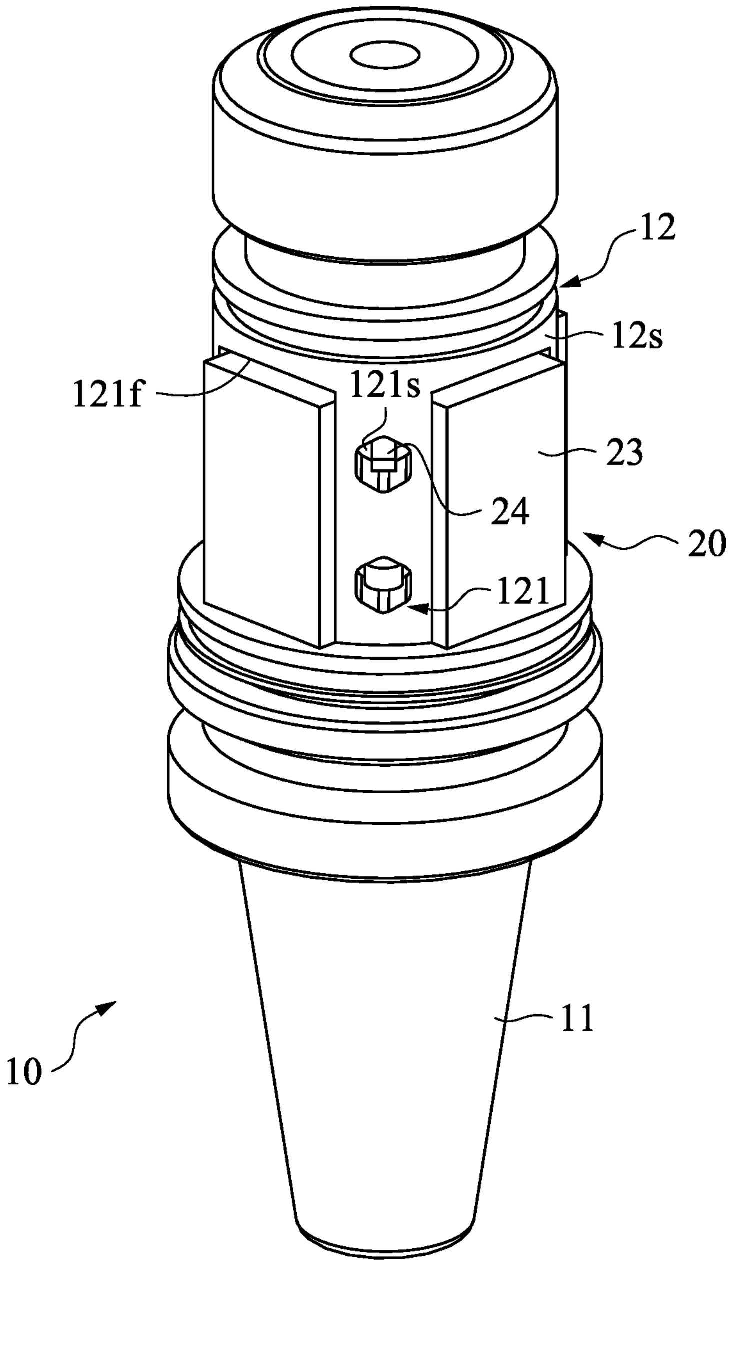
FIG. 1B is a schematic three-dimensional diagram of the sensing tool holder without a housing in accordance with one embodiment of the present disclosure.

Refer to FIG. 1A and FIG. 1B simultaneously. FIG. 1A is a schematic three-dimensional diagram of a sensing tool holder 1 in accordance with one embodiment of the present disclosure. FIG. 1B is a schematic three-dimensional diagram of the sensing tool holder 1 without a housing 30 in accordance with one embodiment of the present disclosure. The sensing tool holder 1 includes a tool holder unit 10, a sensing unit 20 and the housing 30.

Figure 1C:
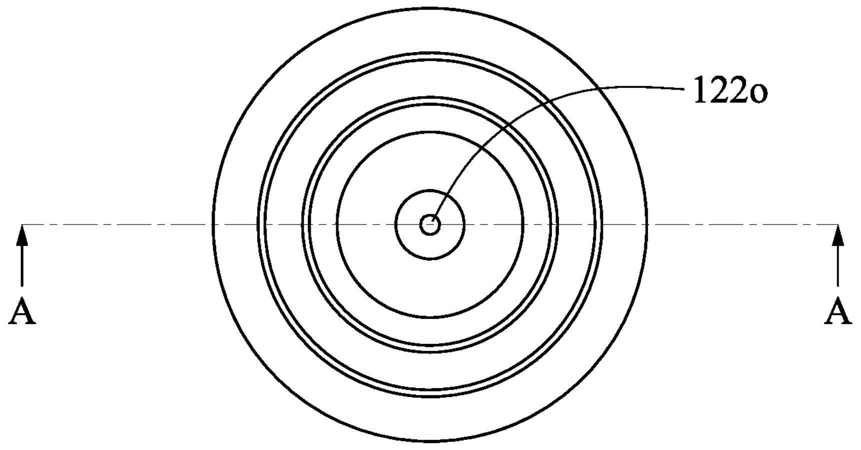
FIG. 1C is a schematic top view of the sensing tool holder in accordance with one embodiment of the present disclosure.
Figure 1D:
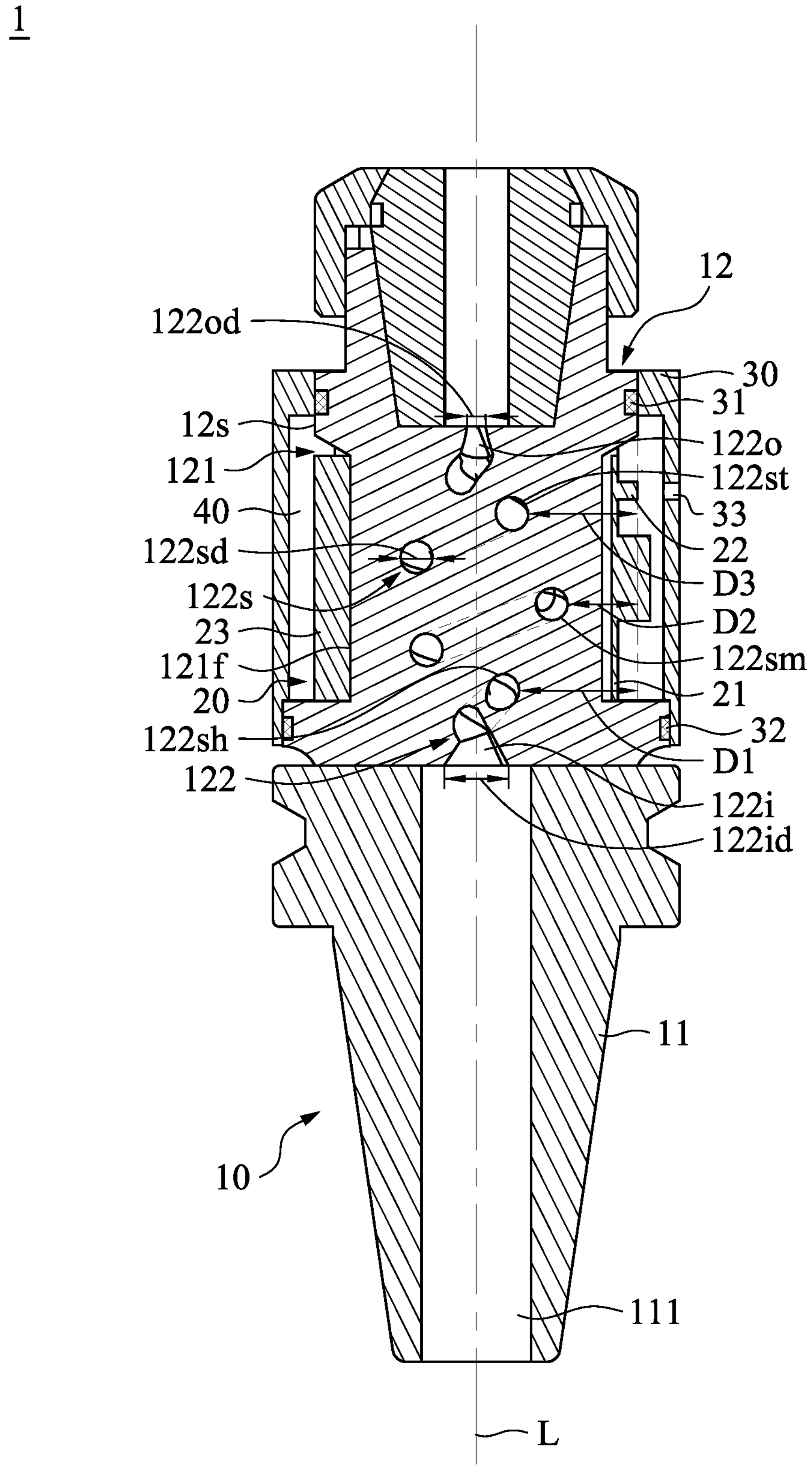
FIG. 1D is a schematic cross-sectional view taken along a line A-A in FIG. 1C.

Refer to FIG. 1C and FIG. 1D simultaneously. FIG. 1C is a schematic top view of the sensing tool holder 1 in accordance with one embodiment of the present disclosure. FIG. 1D is a schematic cross-sectional view taken along a line A-A in FIG. 1C. The tool holder unit 10 can be used to accommodate a tool (not shown), and includes a base 11 and an additive body 12. A passage 111 is formed in the base 11. The passage 111 passes through the base 11, and a cutting fluid can flow through the passage 111. The additive body 12 is mounted on the base 11 by an additive manufacturing method. In detail, the additive manufacturing method for forming the additive body 12 may be a powder bed fusion (PBF) method, but not limited thereto. In one example, the additive body 12 is a powder bed fusion member. As shown in FIG. 1D, the additive body 12 includes an assembling structure 121 and a channel 122. The additive body 12 is made by the additive manufacturing method, such that the assembling structure 121 and the channel 122 are formed together with the additive body 12, the assembling structure 121 and the channel 122 are not formed by a method that destroys the additive body 12, and thus a control degree of the dynamic balance can be increased.

Figure 2A:
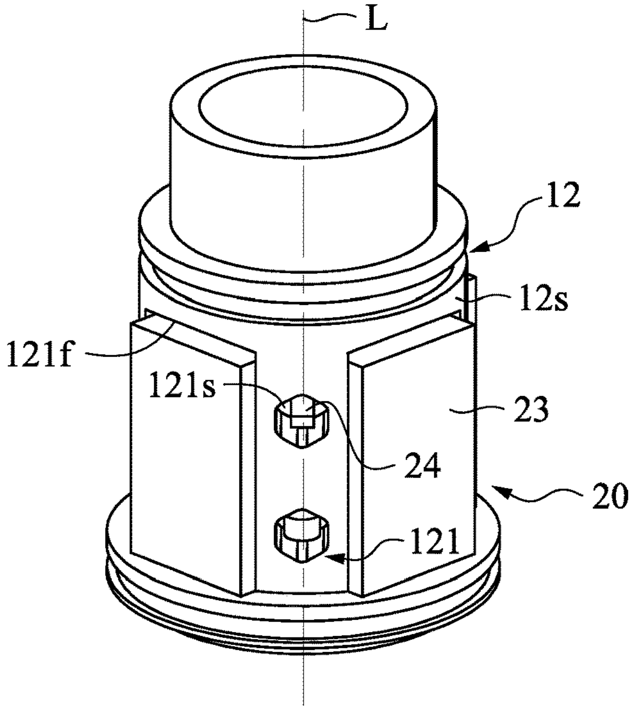
FIG. 2A is a schematic three-dimensional diagram of an additive body and a sensing unit in accordance with one embodiment of the present disclosure.
Figure 2B:
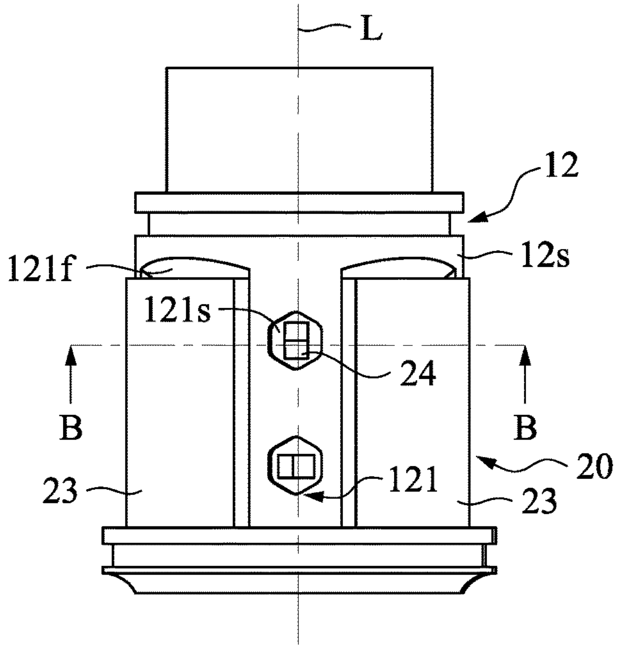
FIG. 2B is a schematic side view of the additive body and the sensing unit in FIG. 2A.
Figure 2C:
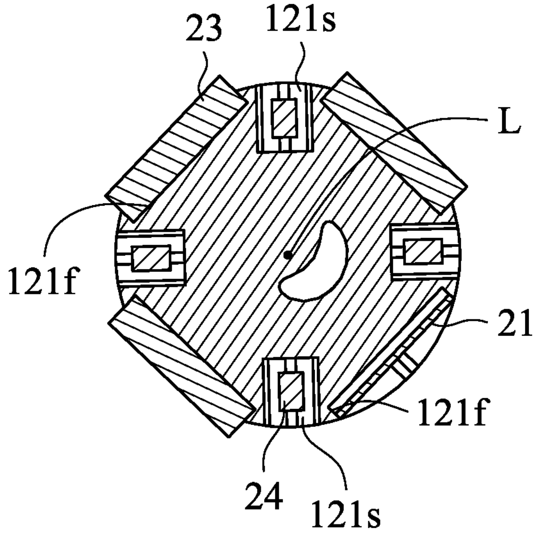
FIG. 2C is a schematic cross-sectional view taken along a line B-B in FIG. 2B.

Referring to FIG. 2A, which is a schematic three-dimensional diagram of the additive body 12 and the sensing unit 20 in accordance with one embodiment of the present disclosure. The assembling structure 121 is formed on an outer surface 12*s* of the additive body 12. The assembling structure 121 includes multiple first assembling recesses 121*f* and multiple second assembling recesses 121*s*. As shown in FIG. 2C, the number of the first assembling recesses 121*f* is four. The first assembling recesses 121*f* are symmetrically arranged in pairs with an axle line L of the additive body 12 as a symmetrical axle, so that the angular momentum balance is increased. As shown in FIG. 2B, a shape of each first assembling recess 121*f* may be generally a quadrilateral, such as a rectangle.

Continuously referring to FIG. 2A and FIG. 2C, the first assembling recesses 121*f* and the second assembling recesses 121*s* are arranged alternately on the outer surface 12*s* of the additive body 12. In other words, each second assembling recess 121*s* is located between the adjacent first assembling recesses 121*f*. In one example, the second assembling recesses 121*s* are symmetrically arranged in pairs with the axle line L of the additive body 12 as the symmetrical axle, so that the angular momentum balance is increased. An outer contour of each second assembling recess 121*s* may be polygonal. Further, as shown in FIG. 2B, the outer contour of each second assembling recess 121*s* may be hexagonal or circular, but not limited thereto. The additive body 12 is formed by the additive manufacturing method, so a hexagon may be selected as the shape of each second assembling recess 121*s*, which can improve the deformation situation without using additional shaping accessories, thereby increasing the manufacturing convenience of the additive body 12. In one example, plural second assembling recesses 121*s* are disposed between the adjacent first assembling recesses 121*f* and may be arranged up and down and spaced apart from each other.

As shown in FIG. 2B, the outer contour of each second assembling recess 121*s* may be hexagonal. When each sensor 24 is installed in the second assembling recess 121*s*, an installation angle of 90 degrees, 180 degrees, or even 45 degrees may be adopted. Depending on the selected installation angle, the sensor 24 can be used to sense a lateral pressure, a positive pressure or a torque of the tool holder unit 10 and provide real-time sensing data. Continuously referring to FIG. 2B, the installation angle of the upper sensor 24 is 90 degrees, such that the upper sensor 24 can be used to sense the lateral pressure of the tool holder unit 10 and is suitable for a cutting process. Continuously referring to FIG. 2B, the installation angle of the lower sensor 24 is 180 degrees, such that the lower sensor 24 can be used to sense the positive pressure of the tool holder unit 10 and is suitable for a drilling process. In addition, when the installation angle of the sensor 24 is 45 degrees, the sensor 24 can be used to sense the torque of the tool holder unit 10 and is suitable for a composite processing process. Therefore, users can arrange the sensor 24 in the second assembling recess 121*s* at various suitable installation angles according to different processing processes. In other words, the second assembling recesses 121*s* of the assembling structure 121 can increase the installation freedom of the sensor 24 of the sensing unit 20. In one example, the sensor 24 can be an embedded sensor and is installed in the second assembling recess 121*s*.

Figure 3:
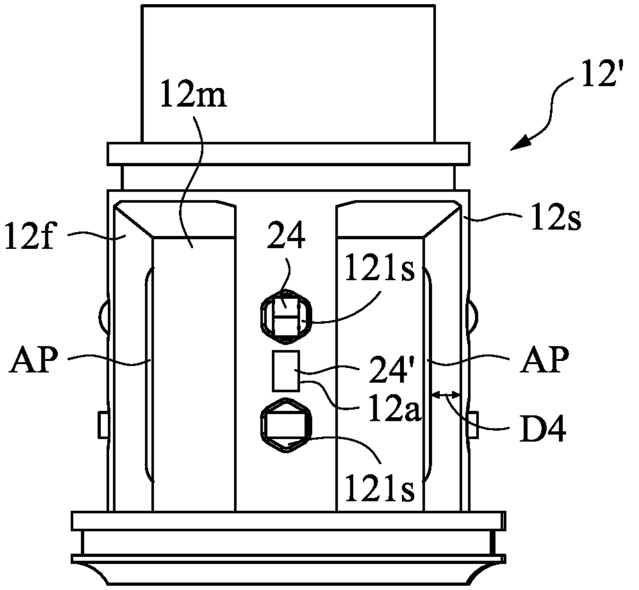
FIG. 3 is a schematic side view of an additive body in a sensing tool holder in accordance with another embodiment of the present disclosure.

Referring to FIG. 3, FIG. 3 is a schematic side view of an additive body 12' in a sensing tool holder in accordance with another embodiment of the present disclosure. The additive body 12' includes plural attached portions 12*a*. In each attached portion 12*a*, the attached portion 12*a* is located between the adjacent second assembling recesses 121*s*. The sensor 24' can be an attached sensor and is attached on the attached portion 12*a*. The addition body 12' includes plural air portions AP. In each air portion AP, the air portion AP is located between the channel 122 and the attached portion 12*a*, thereby reducing the heat conduction to avoid a sensitivity of the attached sensor drop. In one example, when the sensors 24' are attached sensors and respectively attached on the attached portions 12*a*, an installation angle of 45 degrees and 90 degrees may be adopted to sense a lateral pressure, a positive pressure or a torque of the tool holder unit 10 and provide real-time sensing data. In addition, when the sensors are attached sensors, a distance D4 between the outer surface 12*s* of the additive body 12' and the air portion AP can be decreased to a minimum of 2 mm for enhancing the sensing effect.

In one example, the additive body 12' includes a main portion 12*m* and a frame portion 12*f* disposed around the main portion 12*m*. The channel 122 is formed through the main portion 12*m*. The attached portion 12*a* is located on the frame portion 12*f*. The air portion AP is located between the main portion 12*m* and the frame portion 12*f*, thereby a contact area of the frame portion 12*f* and the main portion 12*m* is decreased.

In one example, the embedded sensor and/or the attached sensor can be installed on the additive body 12'. Therefore, the installation flexibility of the sensors is improved to meet customization.

Referring to FIG. 1D, the channel 122 is coiled and formed in the additive body 12, so as to increase a flow path of the cutting fluid in the additive body 12 to fully absorb the heat energy generated by the sensing unit 20. That is, a portion of the heat energy generated by the sensing unit 20 is conducted to the additive body 12, and then the heat energy absorbed by the additive body 12 is then absorbed by the cutting fluid flowing through the channel 122. In other words, the coiled channel 122 can enhance the heat dissipation of the sensing unit 20.

As shown in FIG. 1D, the channel 122 includes an inlet 122*i* and an outlet 122*o*. The inlet 122*i* is located at an end adjacent to the base 11, and the inlet 122*i* fluidly communicates with the passage 111 of the base 11. The outlet 122*o* is located at an end far away from the base 11. In one example, a center of the inlet 122*i* and a center of the outlet 122*o* are both located on the axle line L of the additive body 12. In one example, a diameter 122*od* of the outlet 122*o* is smaller than a diameter 122*id* of the inlet 122*i*, which can provide a pressurizing effect, increase the jet flow rate at the outlet 122*o*, and enhance the accuracy and the chip removal efficiency. In one example, the diameter 122*id* of the inlet 122*i* and the diameter 122*od* of the outlet 122*o* are both tapered. That is, a cross-section of the inlet 122*i* is conical, and a cross-section of the outlet 122*o* is conical, so that the pressurizing effect can be gradually increased.

Referring to FIG. 1D, the additive body 12 is made by the additive manufacturing method, so it is possible to produce the generally spiral channel 122. The channel 122 includes a spiral section 122*s*. Two ends of the spiral section 122*s* are respectively connected to the inlet 122*i* and the outlet 122*o*. An inner diameter 122*sd* of the spiral section 122*s* is smaller than the diameter 122*id* of the inlet 122*i*, and the inner diameter 122*sd* of the spiral section 122*s* is greater that the diameter 122*od* of the outlet 122*o*.

In one example, a minimum distance D2 between a middle section 122*sm* of the spiral section 122*s* and the outer surface 12*s* of the additive body 12 is smaller than a minimum distance D1 between a head section 122*sh* of the spiral section 122*s* and the outer surface 12*s* of the additive body 12, and is also smaller than a minimum distance D3 between a tail section 122*st* of the spiral section 122*s* and the outer surface 12*s* of the additive body 12. Furthermore, the minimum distance D1 between the head section 122*sh* of the spiral section 122*s* and the outer surface 12*s* of the additive body 12 may be equal to the minimum distance D3 between the tail section 122*st* of the spiral section 122*s* and the outer surface 12*s* of the additive body 12, or may be not equal to the minimum distance D3 between the tail section 122*st* of the spiral section 122*s* and the outer surface 12*s* of the additive body 12. In other words, the minimum distance D1 between the head section 122*sh* of the spiral section 122*s* and the outer surface 12*s* of the additive body 12 may be smaller than, equal to, or greater than the minimum distance D3 between the tail section 122*st* of the spiral section 122*s* and the outer surface 12*s* of the additive body 12. Except that a length of the channel 122 can be adjusted, the positions where the channel 122 passes can also be adjusted, so that the channel 122 is adjacent to the places where heat dissipation is required, thereby assisting in enhancing the heat dissipation efficiency.

In one example, the minimum distance D2 between the middle section 122*sm* of the spiral section 122*s* and the outer surface 12*s* of the additive body 12 is equal to the minimum distance D1 between the head section 122*sh* of the spiral section 122*s* and the outer surface 12*s* of the additive body 12, and is also equal to the minimum distance D3 between the tail section 122*st* of the spiral section 122*s* and the outer surface 12*s* of the additive body 12. In one example, the minimum distance D2 between the middle section 122*sm* of the spiral section 122*s* and the outer surface 12*s* of the additive body 12 is equal to the minimum distance D1 between the head section 122*sh* of the spiral section 122*s* and the outer surface 12*s* of the additive body 12, and is smaller than the minimum distance D3 between the tail section 122*st* of the spiral section 122*s* and the outer surface 12*s* of the additive body 12. In one example, the minimum distance D2 between the middle section 122*sm* of the spiral section 122*s* and the outer surface 12*s* of the additive body 12 is smaller than the minimum distance D1 between the head section 122*sh* of the spiral section 122*s* and the outer surface 12*s* of the additive body 12, and is equal to the minimum distance D3 between the tail section 122*st* of the spiral section 122*s* and the outer surface 12*s* of the additive body 12.

The head section 122*sh* is connected to the inlet 122*i*. The tail section 122*st* is connected to the outlet 122*o*. Two ends of the middle section 122*sm* are respectively connected to the head section 122*sh* and the tail section 122*st*. That is, the inlet 122*i*, the head section 122*sh*, the middle section 122*sm*, the tail section 122*st* and the outlet 122*o* are arranged sequentially.

As shown in FIG. 1D, the sensing unit 20 is arranged on the assembling structure 121 of the additive body 12, and can be used to sense the stress on the tool holder unit 10 and the tool during processing. The sensing unit 20 includes a circuit board 21, a transmitting unit 22, a power supply 23 and the sensors 24 (as shown in FIG. 1B). The circuit board 21 may be disposed in the corresponding first assembling recess 121*f*. The transmitting unit 22 is disposed on the circuit board 21.

The power supply 23 is disposed in the corresponding first assembling recess 121*f*, and the power supply 23 and the circuit board 21 are opposite to each other on both sides of the axle line L of the additive body 12. The power supply 23 is configured to supply the power required by the circuit board 21 and the transmitting unit 22. In one example, the number of the power supply 23 is one, the number of the circuit board 21 is one, and the power supply 23 and the circuit board 21 are opposite to each other. In one example, there are three power supplies 23 and one circuit board 21, and these power supplies 23 are spaced from each other, and the middle power supply 23 is opposite to the circuit board 21.

The sensor 24 is disposed in the corresponding second assembling recess 121*s* and is electrically connected to the circuit board 21. The sensor 24 can sense and generate a sensing signal when the tool holder unit 10 is forced by an external force, such as torsion or tension. In one example, the sensor 24 may be a piezoelectric material or a pressure sensor.

The transmitting unit 22 is signally connected to the circuit board 21 and the sensor 24. Sensing data of the sensor 24 can be transmitted to the circuit board 21. After the circuit board 21 processes the sensing data, the processed sensing data are transmitted to an external control device by the transmitting unit 22. The external control device further determines a processing state of the tool holder unit 10 through the sensing data and adjusts the processing parameters.

Referring to FIG. 1A and FIG. 1D simultaneously, the housing 30 is mounted around the additive body 12 and covers the sensing unit 20. A closed space 40 is formed between the housing 30 and the additive body 12. In other words, the sensing unit 20 is located in the closed space 40. That is, the circuit board 21, the transmitting unit 22, the power supply 23 and the sensor 24 are all located in the closed space 40. In one example, the housing 30 includes a through hole 33. The through hole 33 faces the transmitting unit 22, so that the processed sensing data are transmitted to the external control device by the transmitting unit 22.

In one example, a first sealing ring 31 is disposed between a top portion of the housing 30 and the additive body 12, and a second sealing ring 32 is disposed between a bottom portion of the housing 30 and the additive body 12 to improve a sealing effect of the closed space 40. In a cutting operation, the housing 30 can protect the sensing unit 20, so that the cutting fluid and chips are not sprayed into the closed space 40, and an operation of the sensing unit 20 is not affected. Therefore, the sensing unit 20 is effectively protected and a service life of the sensing unit 20 is prolonged through the configuration of the housing 30 and the formation of the closed space 40.

According to the aforementioned embodiments, the assembling structure of the sensing unit of the present disclosure is formed on the outer surface of the additive body and provides the second assembling recesses. Considering the angular momentum balance and a requirement of the angle for receiving information, the sensor of the sensing unit can be disposed in the suitable second assembling recess. The sensing unit can be disposed in the second assembling recesses with different installation angles according to a requirement of sensing. In other words, in addition to providing the installation of different sensors, the second assembling recesses can also provide the sensor with different installation angles. Therefore, the installation freedom of the sensor can be increased effectively.

Secondly, the channel of the additive body can increase the flow path of the fluid, and a spiral extension range of the channel covers the sensing unit, that is, the channel extends spirally and passes through the additive body. Therefore, when the cutting fluid flows through the channel, the cutting fluid can absorb the heat energy of the sensing unit and the heat energy generated during processing, so as to increase the heat dissipation efficiency. A working temperature of the sensing unit can be kept stable and is not affected by long processing time. Therefore, the sensor can work normally and transmit the sensing data stably.

Furthermore, the diameter of the outlet of the channel is smaller than the diameter of the inlet, which can provide the pressurizing effect, increase the jet flow rate at the outlet, and enhance the accuracy and the chip removal efficiency, so as to increase the processing quality and service life.

The housing covers the sensing unit, and the closed space is formed between the housing and the additive body, such that the housing can protect the sensing unit to prolong the service life of the sensing unit and enhance a stability of the sensing unit in monitoring.

Although the present disclosure has been described with the above embodiments, the above embodiments are not used to limit the present disclosure. Those skilled in the art can make various changes and modifications without departing from the spirit and scope of the present disclosure. Therefore, the protection scope of the present disclosure should be based on the defined by the scope of the appended patent application.

What is claimed is:

1. A sensing tool holder, comprising:

a tool holder unit comprising:

a base, wherein a passage is formed in the base;

an additive body mounted on the base by an additive manufacturing method, the additive body comprising:

an assembling structure formed on an outer surface of the additive body and comprising:

a plurality of first assembling recesses symmetrically arranged in pairs with an axle line of the additive body as a symmetrical axle; and a plurality of second assembling recesses symmetrically arranged in pairs with the axle line of the additive body as the symmetrical axle; and a channel coiled and formed in the additive body, wherein the channel comprises an inlet and an outlet, the inlet communicates with the passage, and a diameter of the outlet is smaller than a diameter of the inlet, wherein the channel comprises a spiral section, two ends of the spiral section are respectively connected to the inlet and the outlet, an inner diameter of the spiral section is smaller than the diameter of the inlet, and the inner diameter of the spiral section is greater than the diameter of the outlet:

a sensing unit arranged on the assembling structure; and a housing mounted around the additive body and covering the sensing unit, wherein a closed space is formed between the housing and the additive body.

2. The sensing tool holder of claim 1, wherein the additive body is a powder bed fusion member.

3. The sensing tool holder of claim 1, wherein a center of the inlet and a center of the outlet are both located on the axle line of the additive body.

4. The sensing tool holder of claim 1, wherein the sensing unit comprises:

a circuit board;

a transmitting unit disposed on the circuit board;

a power supply configured to supply a power required by the circuit board and the transmitting unit, wherein the circuit board and the power supply are disposed in symmetrical two of the plurality of first assembling recesses; and at least one sensor, wherein each of the at least one sensor is disposed in a corresponding one of the plurality of second assembling recesses and is electrically connected to the circuit board;

wherein, the transmitting unit is signally connected to the circuit board and each of the at least one sensor.

5. The sensing tool holder of claim 4, wherein the housing comprises a through hole, and the through hole faces the transmitting unit.

6. The sensing tool holder of claim 1, wherein an outer contour of each of the second assembling recesses is polygonal.

7. The sensing tool holder of claim 6, wherein the outer contour of each of the second assembling recesses is hexagonal.

8. The sensing tool holder of claim 1, wherein a minimum distance between a middle section of the spiral section and the outer surface of the additive body is smaller than a minimum distance between a head section of the spiral section and the outer surface of the additive body, and is also smaller than a minimum distance between a tail section of the spiral section and the outer surface of the additive body.

9. The sensing tool holder of claim 8, wherein the head section is connected to the inlet, the tail section is connected to the outlet, and two ends of the middle section are respectively connected to the head section and the tail section.

* * * * *